(12) United States Patent
Chen et al.

(10) Patent No.: US 7,311,433 B2
(45) Date of Patent: Dec. 25, 2007

(54) BACKLIGHT MODULE FOR AN LCD (LIQUID CRYSTAL DISPLAY) SYSTEM

(75) Inventors: Shih-Hsien Chen, Taichung Hsien (TW); Kuang-Tao Sung, Taichung Hsien (TW)

(73) Assignee: AU Optronics Corp., Hsinchu (TW)

( * ) Notice: Subject to any disclaimer, the term of this patent is extended or adjusted under 35 U.S.C. 154(b) by 63 days.

(21) Appl. No.: 10/910,283

(22) Filed: Aug. 4, 2004

(65) Prior Publication Data
US 2005/0201121 A1    Sep. 15, 2005

(30) Foreign Application Priority Data
Mar. 9, 2004 (TW) .............................. 93106195 A

(51) Int. Cl.
*F21V 7/04* (2006.01)
(52) U.S. Cl. .................. 362/617; 362/330; 362/560; 362/621
(58) Field of Classification Search ............... 362/330, 362/511, 558, 560–561, 617–618, 621–622
See application file for complete search history.

(56) References Cited

U.S. PATENT DOCUMENTS

| | | | |
|---|---|---|---|
| 5,390,436 A * | 2/1995 | Ashall | 40/546 |
| 5,649,754 A * | 7/1997 | Matsumoto | 362/618 |
| 5,857,761 A * | 1/1999 | Abe et al. | 362/551 |
| 5,926,033 A * | 7/1999 | Saigo et al. | 362/600 |
| 6,079,838 A * | 6/2000 | Parker et al. | 362/617 |
| 6,199,994 B1 * | 3/2001 | Watai | 362/617 |
| 6,609,809 B2 * | 8/2003 | Ohkawa | 362/626 |
| 6,612,709 B2 * | 9/2003 | Yamada et al. | 362/617 |
| 7,056,005 B2 * | 6/2006 | Lee | 362/625 |
| 2002/0044436 A1 * | 4/2002 | Ohkawa | 362/31 |
| 2002/0196388 A1 | 12/2002 | Ohkawa | 349/65 |

* cited by examiner

*Primary Examiner*—John Anthony Ward
(74) *Attorney, Agent, or Firm*—Troxell Law Office, PLLC

(57) ABSTRACT

A light guide for an LCD system has a light incident side, and is formed with a plurality of pattern structures. Each of the pattern structures has a pair of diagonally-disposed first points defining a first length therebetween, and a pair of diagonally-disposed second points defining a second length therebetween. The second length extends transverse to and crosses the first length. A ratio of the first length and the second length of one of the pattern structures adjacent to the light incident side is greater than a ratio of the first length and the second length of one of the pattern structures distant from the light incident side.

29 Claims, 6 Drawing Sheets

BACKLIGHT MODULE FOR AN LCD (LIQUID CRYSTAL DISPLAY) SYSTEM

FIELD OF THE INVENTION

The present invention relates to a backlight module of an LCD (Liquid Crystal Display) system, more specifically to an arrangement for scattering a plurality of pattern structures over a light guide of the backlight module so as to enhance uniform brightness in the light guide of the backlight module.

BACKGROUND OF THE INVENTION

The LCDs (Liquid Crystal Display) can be constructed in a relatively compact size due to the rapid advance of TFT (Thin Film Transistor) or LTPS (Low Temperature Poly-Silicon) technique in addition to its lower power consumption and low radiation. The manufacturers worldwide have devoted themselves to further research and thus improve the materials, processes and equipments. The qualities of the LCD are accordingly and largely promoted while the cost goes down day-by-day, which, in turn causes a wide use of the LCD system at homes and offices. Note that the LCD itself is not a light emitting instrument, and requires a backlight module in order to display images and information on the display panel. Good or bad quality of the LCD system can directly affect pixel pitch of the backlight module. The backlight module is therefore an important component in the LCD system.

Referring to FIG. 1, an exploded view of a prior art backlight module is shown to include an upper prism 10, a lower prism 11, a diffuser 12, a light guide 13, a plastic frame 14 and a reflection sheet 15. Generally, a light source (not shown) is provided at one edge of the light guide 13 in the edge light form so as to emit light beams into the light guide 13. The light beams emitted from the light source pass through the light guide 13, and then reflects from an upper surface to another direction. The plastic frame 14 is disposed behind the light guide 13 in order to prevent diffusion of light beams from a lower surface of the light guide 13 so that the diffused light beams can hit back the light guide 13, thereby increasing the utilization of the light beams. An optical film unit consisting of the diffuser 12, the lower prism 11 and the upper prism 10, is disposed on the light guide 13 in order to enhance the brightness of the display panel uniformly.

The aforesaid upper and lower prisms 10,11 are commonly known as BEF (brightness enhanced film), and are used mainly for enhancing focusing effect. Alternately, optical polarizers can be used for providing the same focusing effect. The diffuser 12 above the light guide 13 is used for diffusing uniformly and tenderly the light beams passing through the light guide 13.

In order to enhance the transmission, brightness and reflection of light beams from the upper and lower surfaces of the light guide 13, a plurality of pattern or V-groove (V-cut) structures are fabricated on the upper and lower surfaces by screen printing technique such that the light beams can diffuse and reflect therefrom. Referring to FIGS. 2A and 2B, the light guide 13 of the prior art backlight module 1 is shown to have dot patterns 131, wherein the dots in FIG. 2A are fabricated in parallel rows in such a manner that the dot distant from a light incident side of the light guide 13 has a larger dimension than the dot adjacent to the light incident side of the light guide 13 so as to increase the light reflection effect. In FIG. 2B, the dot in one of the specific row is offset from a nearby dot of an adjacent row, and the dots in the row adjacent to the light incident side of the light guide 13 are sparsely distributed while the dots in the row distant from the light incident side thereof are densely distributed. FIG. 2C is a side view of the light guide 13, illustrating how the dots are distributed on the lower surface thereof for light reflection therefrom.

In addition to the dot patterns, FIG. 3A shows side view in which, the lower surface of the light guide 13 in the prior art backlight module is formed with a plurality of V-cuts 132 in order to achieve the same effect. FIGS. 3B and 3C respectively show bottom views, illustrating distributions of V-cuts 132, wherein the cuts 132 in FIG. 3B are shown in parallel rows while the cuts 132 in FIG. 3C are shown in concentric rows.

Though the distribution of the pattern or V-cuts of specific patterns on the light guide 13 can provide uniform and enhance brightness effect, there are still some disadvantages resulting from the use of the prior backlight module 1. For instance, in order to lower the purchasing cost of and reduce the power consumption of a mobile phone, only a pair of LEDs (Light Emitting Diode) is provided at the light incident side of the light guide 13. Under such arrangement, there may occur uneven distribution of brightness adjacent to the light incident side of the light guide 13, i.e. a section of area immediately adjacent to the LED is brighter than two opposite areas at two sides of said section of area. In the prior art, the entire area adjacent to the light incident side of the light guide 13 is known as Light Transient Area, and the area distant from the LED and having uniform brightness throughout is known as Active Area (AA). In use, the superiority or inferiority of pixel in the display panel heavily depends on degrees of brightness of the Active Area.

Note that the aforesaid arrangement of the pattern or dot patterns on the light guide 13 though provides uniform distribution of light beams, a space of at least 3.2 mm is preserved in front of the prior art backlight module in order that the defected area cannot be seen on the display panel of the LCD system. Under this arrangement, dimension of the Active Area is adversely reduced and limit the space utility of the prior art backlight module.

In the prior art technique, in order to achieve uniform brightness at the Active Area of the light guide 13, the pattern or dot patterns are fabricated continuously in small scale, which, in turn, results in extra manufacture cost. The prior art technique is unable to solve the existing problem.

SUMMARY OF THE INVENTION

The object of the present invention is to provide an LCD system including a backlight module having a light guide formed with a plurality of pattern structures of unique construction which is capable of providing uniform brightness through out the entire length of the light guide.

A backlight module for brightness enhancement of a LCD system according to the present invention is provided and includes: a light guide providing light propagating paths, and having a light incident side, and being formed with a plurality of pattern structures, each of the pattern structures having a pair of diagonally-disposed first points defining a first length therebetween, and a pair of diagonally-disposed second points defining a second length therebetween and extending transverse to and crossing the first length, wherein a ratio of the first length and the second length of one of the pattern structures adjacent to the light incident side of the light guide is greater than a ratio of the first length and the second length of one of the pattern structures distant from the light incident side of the light guide. A light source can be disposed adjacent to the light incident side of the light guide for emitting light beams thereinto. Optical films can be disposed on the light guide for scattering uniformly the light beams emitted from the light source.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DETAILED DESCRIPTION OF THE PREFERRED EMBODIMENTS

Figure 1:
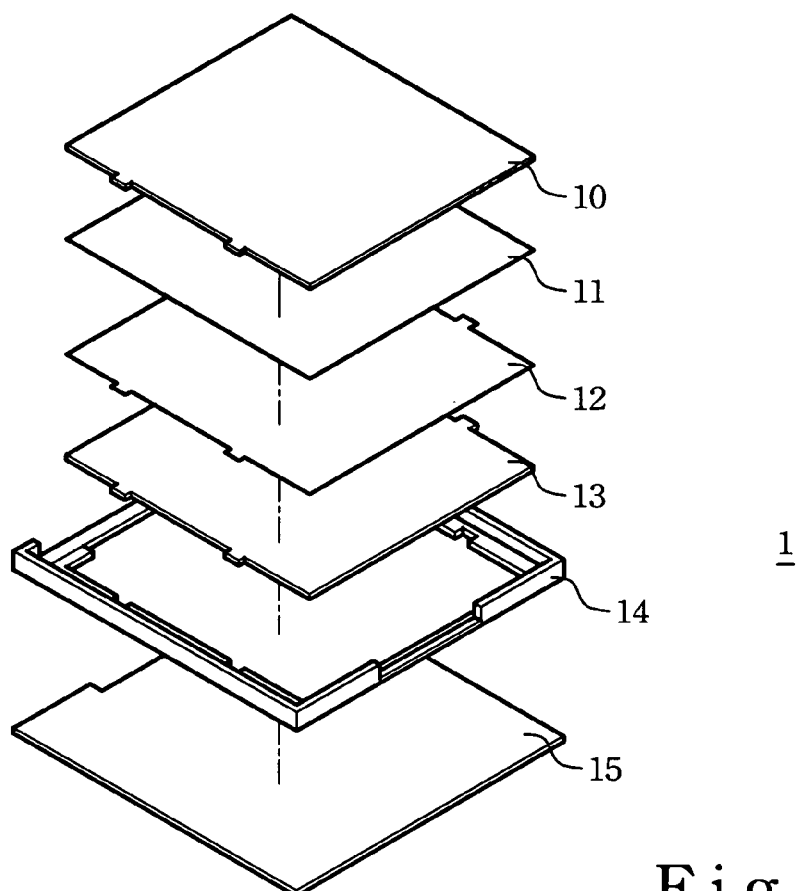
FIG. 1 is an exploded and perspective view of a backlight module used in a conventional LCD (Liquid Crystal Display) system.
Figure 2A:
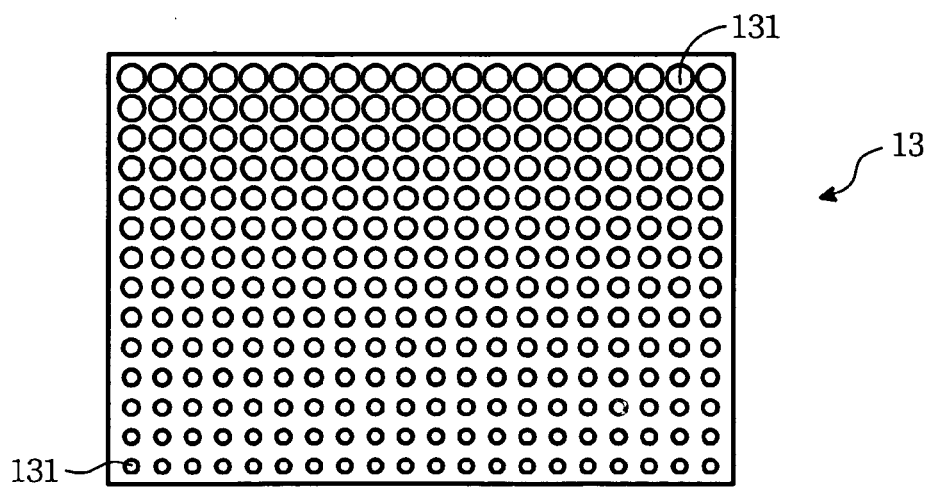
FIGS. 2A and 2B respectively illustrate distribution of pattern or dot patterns on a light guide of the backlight module in the conventional LCD system.
Figure 2B:
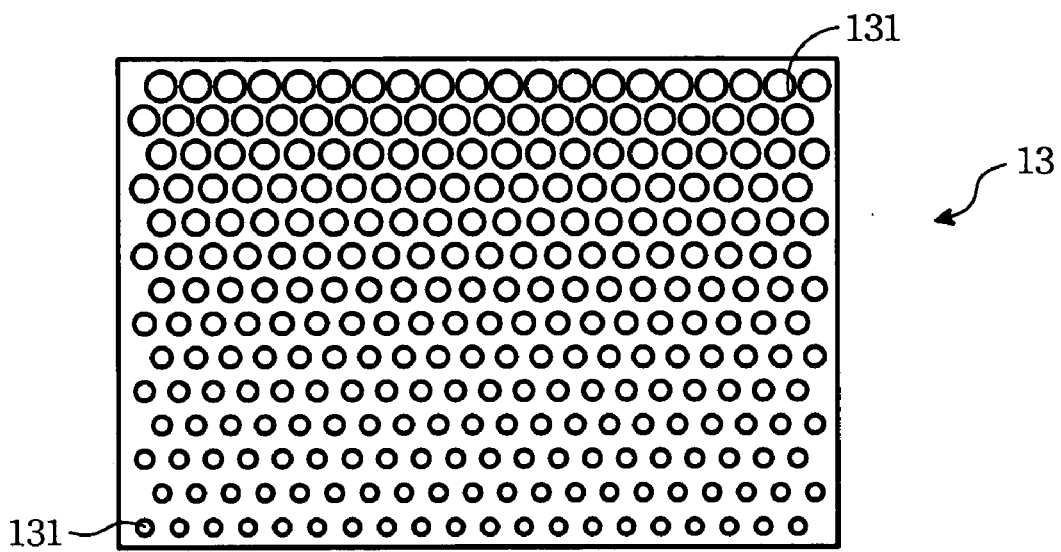
Figure 2C:
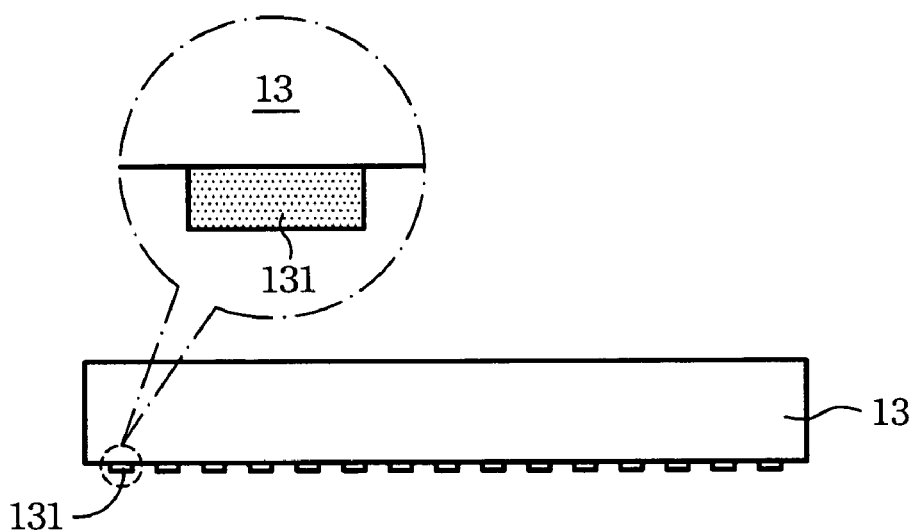
FIG. 2C illustrates a side view of the light guide of the backlight module in the conventional LCD system.
Figure 3A:
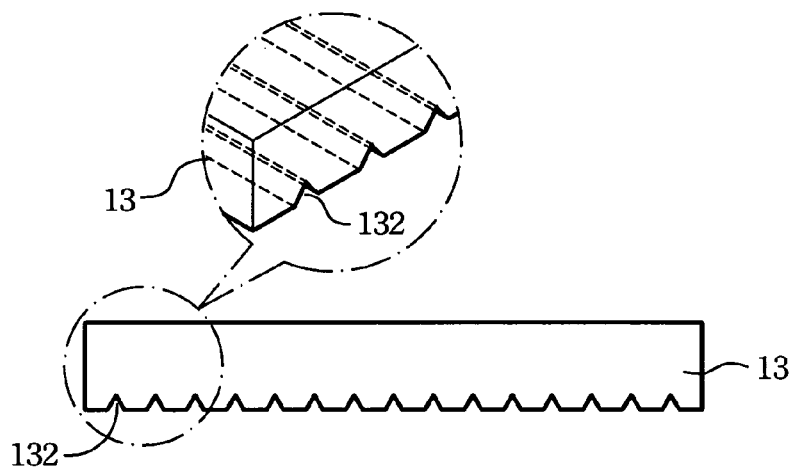
FIG. 3A is a side view of the light guide of the backlight module in the conventional LCD system, wherein a plurality of V-cuts are formed on a plate face of the light guide.
Figure 3B:
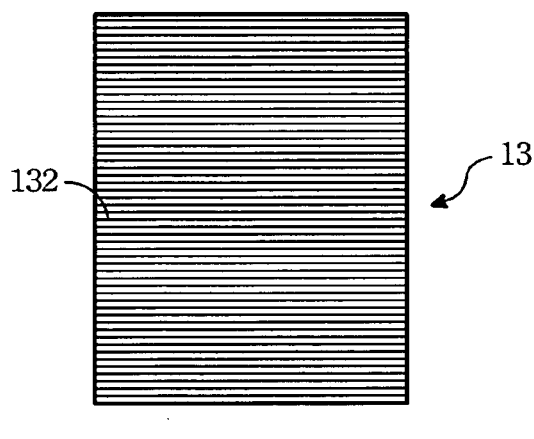
FIGS. 3B and 3C respectively show bottom views of the light guide of the backlight module in the conventional LCD system, illustrating how V-cuts are formed on the plate face of the light guide.
Figure 3C:
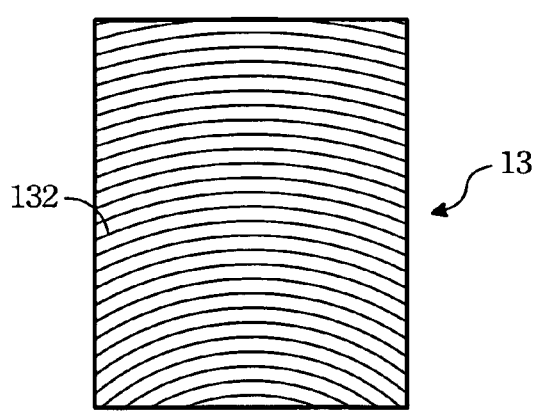
Figure 4:
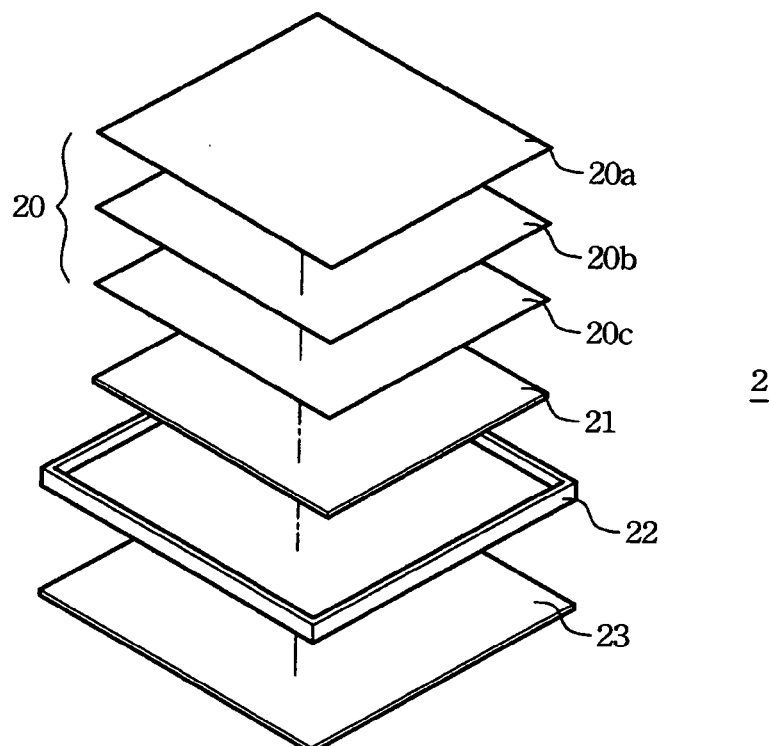
FIG. 4 is an exploded and perspective view of a backlight module used in an LCD (Liquid Crystal Display) system according to the present invention.

Referring to FIG. 4, a backlight module 2 for brightness enhancement of a LCD system according to the present invention is shown to include from top to bottom, an optical film unit 20, a light guide 21, a plastic frame 22, and a reflection sheet 23. The optical film unit 20 is used for uniform brightness enhancement, is disposed on the light guide 21, and includes an upper prism 20a, a lower prism 20b, and diffuser 20c. The light source can be disposed forwardly of the light guide 21, thus the emitting light beams pass into the light guide 21 in the edge light manner such that the light beams are refracted from an upper surface of the light guide 21. In order to prevent occurrence of light refraction, a reflection sheet 22 is disposed below the plastic frame 22 such that the light beams penetrating through the light guide 21 can reflect back into the light guide 13. The light sources includes LEDs (Light Emitting Diode), CCFL (Cold Cathode Fluorescent Luminescence) or other type light source.

Alternatively, optical polarizers can be used for achieving uniform brightness enhancement instead of the upper prism 20a, a lower prism 20b, and diffuser 20c shown in FIG. 4.

Figure 5:
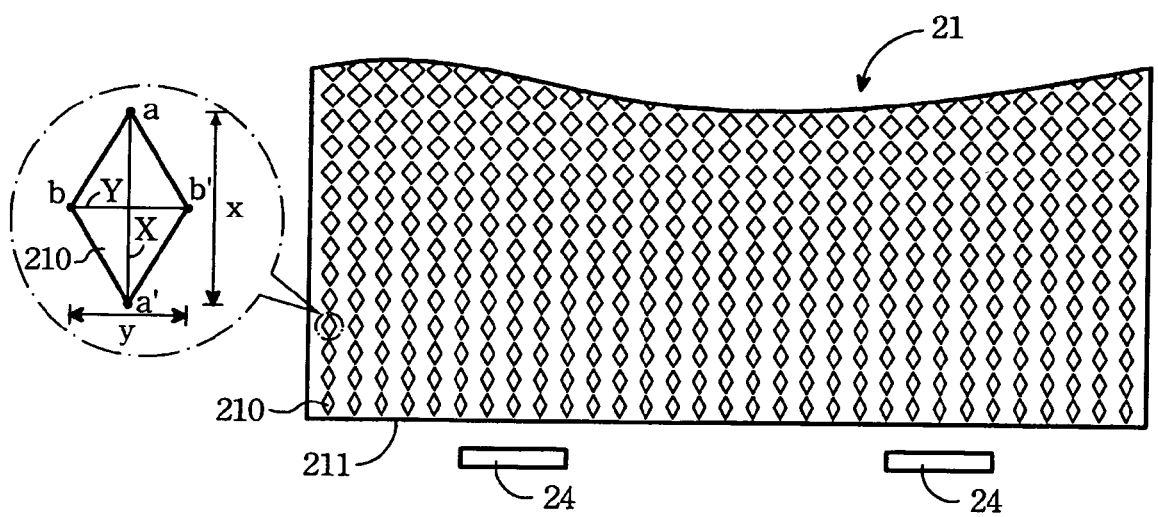
FIG. 5 is a fragmentary view of a light guide employed in the backlight module used in the LCD system according to the present invention.
Figure 6:
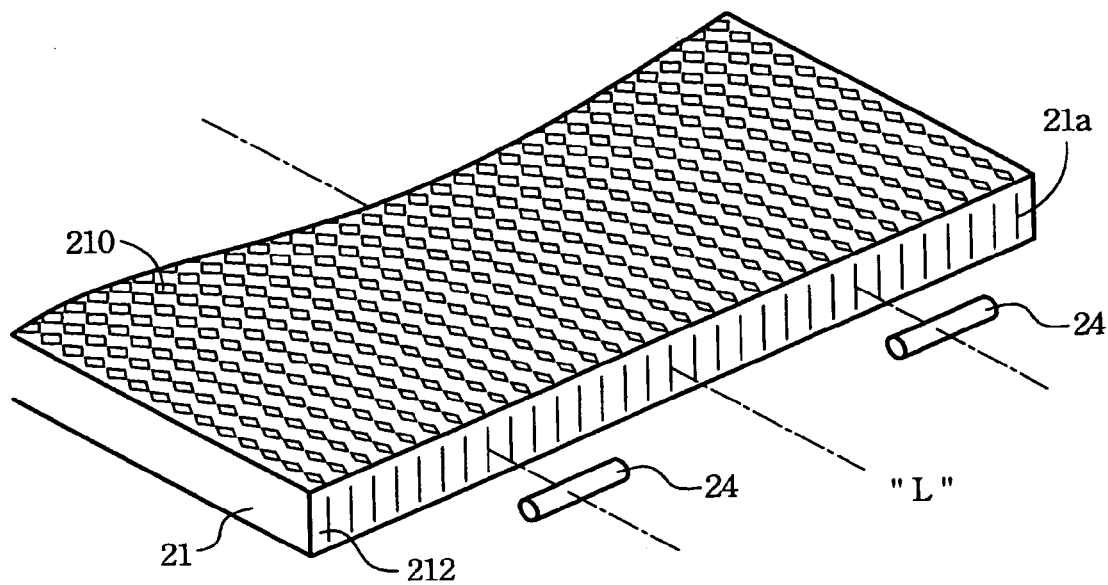
FIG. 6A is a fragmentary perspective view of the light guide employed in the backlight module used in the LCD system according to the present invention.
FIG. 6B is a fragmentary perspective view of a modified light guide employed in the backlight module used in the LCD system according to the present invention.
Figure 6:
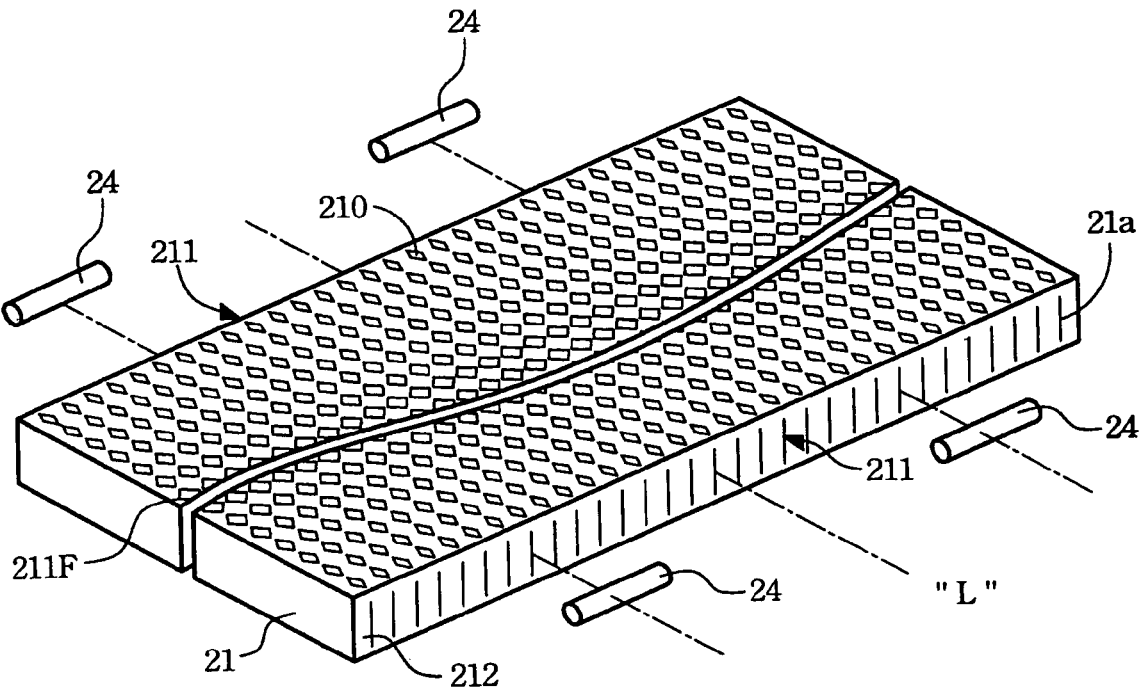

Referring to FIGS. 5 and 6A, the light guide 21 includes a plate which provides light propagating paths and has a light incident side 211 and formed with a plurality of pattern structures 210 of different shapes and configurations by means of screen printing technique so as to enhance light transmission and light diffusion, thereby providing uniform brightness through out the light guide 21. Each of the pattern structures 210 has a pair of diagonally-disposed first points a and a' defining a first length X therebetween, and a pair of diagonally-disposed second points b and b' defining a second length Y therebetween. The second length Y extends transverse to and crosses the first length X. A ratio of the first length X and the second length Y of one of the pattern structures 210 adjacent to the light incident side 211 of the light guide 21 is greater than a ratio of the first length X and the second length Y of one of the pattern structures 210 distant from the light incident side 211 of the light guide 21. The pattern structures 210 include a plurality of polygonal-shaped configurations, such as the configurations 210b or 210c shown in FIG. 8 or such as rhombus, prisms and oblong members.

Referring again to FIG. 6A, in one embodiment of the present invention, the light guide 21 is formed with a plurality of rhombus configurations 210, each having two pairs of diagonally-disposed points respectively defining the first length X and the second length of Y. In order to provide brightness to the light guide 21, two light sources 24 are disposed adjacent to the light incident side 211 of the light guide 21 for emitting light beams thereinto. The ratio of the first length X and the second length Y of one of the rhombus configurations 210 adjacent to the light incident side 211 of the light guide 21 is greater than the ratio of the first length X and the second length Y of one of the rhombus configurations 210 distant from the light incident side 211 of the light guide 21.

In general, the ratio of the first length X and the second length Y of said one of the rhombus configurations 210 adjacent to the light incident side 211 of the light guide 21 in ranges of about 1.20 to 3.00. The ratio of the first length X and the second length Y of said one of the rhombus configurations 210 distant from the light incident side 211 of the light guide 21 in ranges of about 0.20 to 1.20. In other embodiment, the ratio of the first length X and the second length Y of said one of the rhombus configurations 210 adjacent to the light incident side 211 of the light guide 21 can be limited in ranges of about 1.20 to 2.45 while the ratio of the first length X and the second length Y of said one of the rhombus configurations 210 distant from the light incident side 211 of the light guide 21 can be limited in ranges of about 0.43 to 0.54. When the ratios of the rhombus configurations 210 adjacent to and distant from the light incident side of the light guide 21 are thus limited, the most light transmission and light diffusion effect is achieved, thereby providing uniform brightness through out the light guide 21. However, pattern of different configurations may provide different ratio values.

The light guide 21 defines a longitudinal axis "L" which extends perpendicularly from the light incident side 211 and which serves a light transmitting direction of the light source 24. The first length X of each of the rhombus configurations 210 in FIG. 6A extends in a direction parallel to the longitudinal axis "L". In addition, the light incident side 211 of the light guide 21 defines a side face 212 formed with a plurality of V-cut grooves 21a to provide light diffractive effects when light beams pass through the side face 212. It is noted that the V-cut grooves 21a of the side face 212 provide a light incident angle in range of about 130° to 180°.

Referring to FIG. 6B, a modified light guide 21 according to the present invention is shown to have at least two opposite light incident sides 211, and is formed with a plurality of the rhombus configurations 210, wherein the ratio of the first length X and the second length Y of each of the rhombus configurations 210 at the middle of the light guide 21 is smaller than the ratio of the first length X and the second length Y of each of the rhombus configurations 210 adjacent to a respective one of the light incident sides 211. Alternatively, the modified light guide 21 may have two pairs of opposite light incident sides, and the rhombus configurations 21 should be arranged in such a manner to complement the two pairs of the light incident sides.

Figure 8:
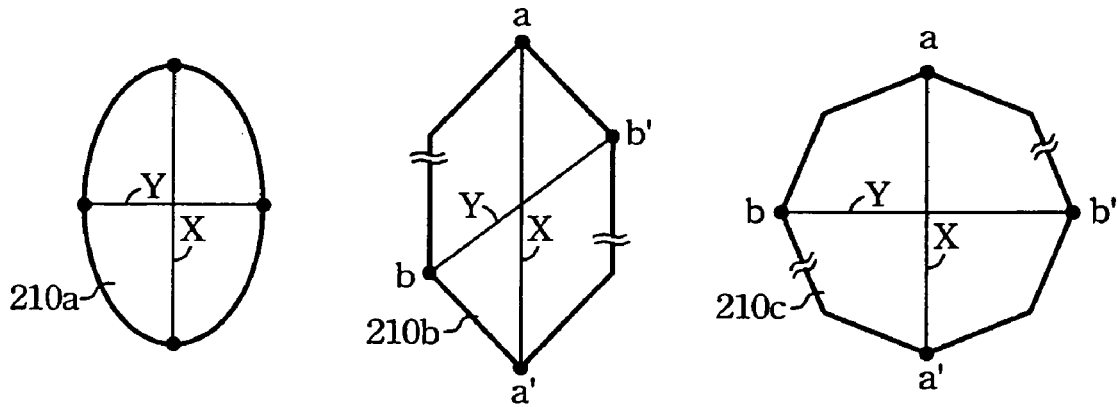
FIG. 8 illustrates the pattern structures such as the substantially oval-shaped configuration or substantially polygonal-shaped configuration.

An important aspect to note that by virtue of variations in ratios between the rhombus configurations 210 adjacent to and/or distant from the light incident side 211 of the light guide 21,the uneven diffusion of brightness through out the Light Transient Area in the light guide 21 of the backlight module according to the present invention is corrected and promoted. Under the spirit of the present invention, the substantially polygonal configurations 210 can further include a plurality of substantially oval-shaped configurations 210a as illustrated in FIG. 8. Each of the oval-shaped configurations 210a has a major diameter and a minor diameter respectively defining the first length X and the second length Y. In this embodiment, the ratio of the first length X and the second length Y of each of the oval-shaped configurations 210a adjacent to the light incident side 211 of the light guide 21 in ranges of about 1.20 to 2.45 while the ratio of the first length X and the second length Y of each of the oval-shaped configurations 210a distant from the light incident side 211 of the light guide 21 in ranges of about 0.43 to 0.54.

Figure 7:
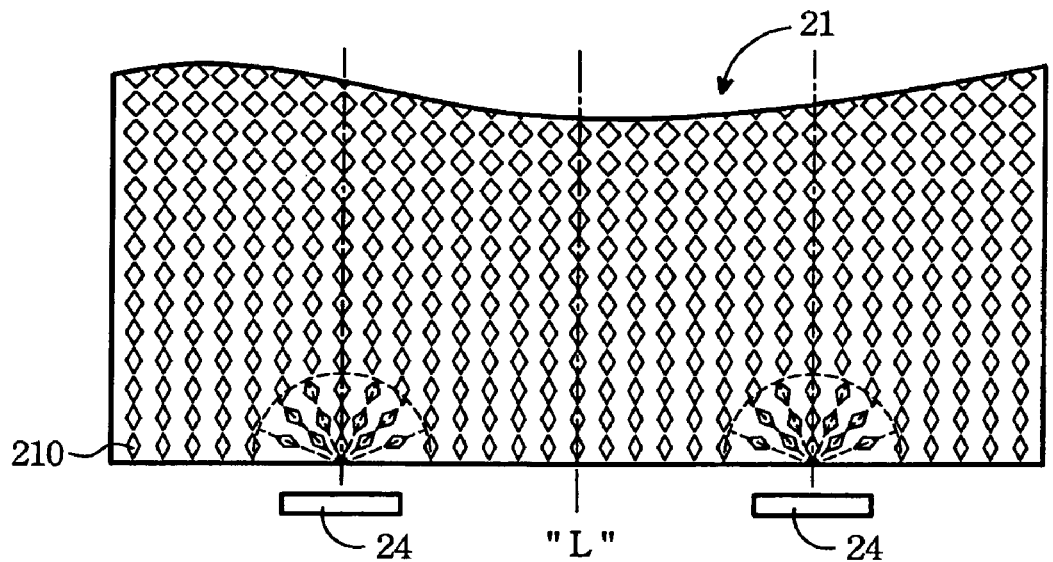
FIG. 7 is a fragmentary front view of another modified light guide employed in the backlight module used in the LCD system according to the present invention.

In order to further provide uniform brightness enhancement in the light guide 21, the orientation of the first lengths X of some the rhombus configurations 210 can be oriented, as best shown in FIG. 7, wherein another modified light guide 21 of the backlight module according to the present invention is shown to have a structure similar to the previous embodiments. The main difference resides in that the first lengths X of some of the rhombus configurations 210 which are located on two opposite sides of the longitudinal axis "L" and which are adjacent to the light incident side 211 of the light guide 21 and a respective one of the light sources extend obliquely with respect to the longitudinal axis "L". Under this arrangement, uniform brightness distribution at the Light Transient Area of the light guide 21 is achieved. Note that the first lengths X of some of the rhombus configurations 210 adjacent to the light incident side of the light guide shown in FIGS. 5, 6A and 6B can be arranged similar to that shown in FIG. 7 so as to achieve uniform brightness distribution at the Light Transient Area of the light guide 21.

Unlike to preservation of a space of 3.2 mm from the Light Transient Area of the prior art the light guide, a lesser space is required in range of about 2.4 to 2.8 mm to be preserved in front of the light guide 21 of the present invention to achieve the same result. In other words, the arrangement of pattern structures according to the present invention enhances uniform brightness in a greater degree through out the Light Transient Area in the light guide 21 and subsequently reduces the required space. The object is according met.

As is understood by a person skilled in the art, the foregoing preferred embodiment of the present invention is an illustration of the present invention rather than limiting thereon. It is intended to cover various modifications and similar arrangements included within the spirit and scope of the appended claims, the scope of which should be accorded the broadest interpretation so as to encompass all such modifications and similar structure.

We claim:

1. A backlight module for brightness enhancement of an LCD system comprising:
   a light guide providing light propagating paths being formed with a plurality of pattern structures, each of said pattern structures having a pair of diagonally-disposed first points defining a first length therebetween, and a pair of diagonally-disposed second points defining a second length therebetween, wherein said diagonally-disposed first points are disposed substantially along the light propagating path and said diagonally-disposed second points are disposed substantially to cross the light propagating path, wherein a ratio of said first length and said second length of one of said pattern structures adjacent to a light incident side of said light guide is substantially greater than a ratio of said first length and said second length of one of said pattern structures distant from said light incident side of said light guide.

2. The backlight module according to claim 1, further comprising at least one light source disposed adjacent to said light incident side of said light guide for emitting light beams thereinto.

3. The backlight module according to claim 2, further comprising optical films disposed on said light guide for scattering uniformly said light beams emitted from said light source.

4. The backlight module according to claim 1, wherein said ratio of said first length and said second length of said one of said pattern structures adjacent to said light incident side of said light guide ranges in ranges of about 1.20 to 2.45, and wherein said ratio of said first length and said second length of said one of said pattern structures distant from said light incident side of said light guide ranges in ranges of about 0.43 to 0.54.

5. The backlight module according to claim 1, wherein said pattern structures includes a substantially oval-shaped configuration and a substantially polygonal-shaped configuration.

6. The backlight module according to claim 2, wherein said light guide further defines a longitudinal axis which substantially extends perpendicular from said light incident side and which serves as a light-transmitting direction of said light source, said first length of each of said pattern structures substantially extending parallel to said longitudinal axis.

7. The backlight module according to claim 6, wherein said first length of said one of said pattern structures adjacent to said light incident side of said light guide substantially extends oblique with respect to said longitudinal axis.

8. The backlight module according to claim 5, wherein said substantially polygonal-shaped configuration comprises a rhombus having two pairs of diagonally-disposed points respectively defining said first length and said second length of a respective one of said pattern structures.

9. The backlight module according to claim 8, wherein said ratio of said first length and said second length of said rhombus adjacent to said light incident side in ranges of about 1.20 to 2.45, and wherein said ratio of said first length and said second length of said rhombus distant from said light incident side in ranges of about 0.43 to 0.54.

10. The backlight module according to claim 1, wherein said light incident side of said light guide defines a side face formed with a plurality of V-cut grooves to provide light diffractive effects when light beams pass therethrough.

11. The backlight module according to claim 10, wherein said light incident side provides a light incident angle in ranges of about 130° to 180° via said V-cut grooves.

12. A light guide for an LCD comprising:
a plate, formed with a plurality of pattern structures, each of said pattern structures having a pair of diagonally-disposed first points defining a first length there between, and a pair of diagonally-disposed second points defining a second length there between, wherein said diagonally-disposed first points are disposed substantially along the light propagating path and said diagonally-disposed second points are disposed substantially to cross the light propagating path, wherein a ratio of said first length and said second length of one of said pattern structures adjacent to a light incident side of said plate is substantially greater than a ratio of said first length and said second length of one of said pattern structures distant from said light incident side of said plate.

13. The light guide according to claim 12, further comprising at least one light source disposed adjacent to said light incident side for emitting light beams thereinto.

14. The light guide according to claim 12, wherein said pattern structures include a substantially oval-shaped configuration and a substantially polygonal-shaped configuration.

15. The light guide according to claim 13 wherein said plate further defines a longitudinal axis which extends substantially perpendicular from said light incident side and which serves as a light-transmitting direction of said light source, said first length of each of said pattern structures substantially extending parallel to said longitudinal axis.

16. The light guide according to claim 15, wherein said first length of said one of said pattern structures adjacent to said light incident side substantially extends oblique with respect to said longitudinal axis.

17. The light guide according to claim 14, wherein said substantially polygonal-shaped configuration comprises a rhombus having two pairs of diagonally-disposed points respectively defining said first length and said second length of a respective one of said pattern structures.

18. A light guide comprising:
a plate, having two opposite light incident sides and one surface formed with a plurality of patterns, each of said patterns having a pair of diagonally-disposed first points defining a first length therebetween, and a pair of diagonally-disposed second points defining a second length therebetween, wherein said diagonally-disposed first points are disposed substantially along the light propagating path and said diagonally-disposed second points are disposed substantially to cross the light propagating path, wherein a ratio of said first length and said second length of one of said patterns adjacent to one of said light incident sides of said plate is substantially greater than a ratio of said first length and said second length of one of said patterns distant from said one of said light incident sides of said plate.

19. A light guide, comprising:
a plate, having a plurality of surfaces and a light incident side; and
a plurality of patterns, formed on said at least one of said surfaces, each of said patterns having a pair of diagonally-disposed first points defining a first length therebetween, and a pair of diagonally-disposed second points defining a second length therebetween, wherein said diagonally-disposed first points are disposed substantially along the light propagating path and said diagonally-disposed second points are disposed substantially to cross the light propagating path, wherein a ratio of said first length and said second length of one of said patterns adjacent to said light incident side is substantially greater than a ratio of said first length and said second length of one of said patterns distant from said light incident side.

20. The light guide according to claim 19, further comprising at least one light source disposed adjacent to said light incident side of said plate for emitting light beams thereinto.

21. The light guide according to claim 20, further comprising optical films disposed on said plate for scattering uniformly said light beams emitted from said light source.

22. The light guide according to claim 19, wherein said ratio of said first length and said second length of said one of said patterns adjacent to said light incident side of said plate ranges in ranges of about 1.20 to 2.45, and wherein said ratio of said first length and said second length of said one of said patterns distant from said light incident side ranges in ranges of about 0.43 to 0.54.

23. The light guide according to claim 19, wherein said patterns includes a substantially oval-shaped configuration and a substantially polygonal-shaped configuration.

24. The light guide according to claim 23, wherein said substantially polygonal-shaped configuration comprises a rhombus having two pairs of diagonally-disposed points respectively defining said first length and said second length of a respective one of said patterns.

25. The light guide according to claim 24, wherein said ratio of said first length and said second length of said rhombus adjacent to said light incident side in ranges of about 1.20 to 2.45, and wherein said ratio of said first length and said second length of said rhombus distant from said light incident side in ranges of about 0.43 to 0.54.

26. The light guide according to claim 19, wherein said plate further defines a longitudinal axis which substantially extends perpendicular from said light incident side and which serves as a light-transmitting direction of said light source, said first length of each of said patterns substantially extending parallel to said longitudinal axis.

27. The light guide according to claim 26, wherein said first length of said one of said patterns adjacent to said at least one of said light incident side of said plate substantially extends oblique with respect to said longitudinal axis.

28. The light guide according to claim 19, wherein said light incident side defines a side face formed with a plurality of V-cut grooves to provide light diffractive effects when light beams pass therethrough.

29. The light guide according to claim 28, wherein said light incident side provides a light incident angle in ranges of about 130° to 180° via said V-cut grooves.

* * * * *